(12) United States Patent
Chen et al.

(10) Patent No.: US 6,636,524 B1
(45) Date of Patent: Oct. 21, 2003

(54) METHOD AND SYSTEM FOR HANDLING THE OUTPUT QUEUING OF RECEIVED PACKETS IN A SWITCHING HUB IN A PACKET-SWITCHING NETWORK

(75) Inventors: Jen-Kai Chen, Taipei (TW); Jiann-Hwa Liou, Taichung (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/455,005

(22) Filed: Dec. 3, 1999

(30) Foreign Application Priority Data

Aug. 27, 1999 (TW) ........................ 88114692 A

(51) Int. Cl.[7] .................. H04L 12/28; H04L 12/56
(52) U.S. Cl. .................... 370/418; 370/390; 370/429; 370/432
(58) Field of Search ................. 370/390, 432, 370/312, 412–418, 428–429, 230, 238, 238.1, 389, 392, 395.1, 400, 411, 401, 463, 410

(56) References Cited

U.S. PATENT DOCUMENTS

| | | | |
|---|---|---|---|
| 6,092,108 A | 7/2000 | DiPlacido et al. | 709/224 |
| 6,128,306 A * | 10/2000 | Simpson et al. | 370/412 |
| 6,320,861 B1 * | 11/2001 | Adam et al. | 370/395.7 |
| 6,347,089 B1 | 2/2002 | Tsui et al. | 370/425 |
| 6,363,075 B1 * | 3/2002 | Huang et al. | 370/412 |
| 6,487,171 B1 | 11/2002 | Honig et al. | 370/235 |
| 6,493,315 B1 * | 12/2002 | Simpson et al. | 370/229 |
| 6,574,232 B1 | 6/2003 | Honig et al. | 370/413 |

* cited by examiner

*Primary Examiner*—Ricky Ngo
*Assistant Examiner*—Yvonne Q. Ha
(74) *Attorney, Agent, or Firm*—J. C. Patents

(57) ABSTRACT

A method and system is provided for use on a switching hub in a packet-switching network for handling the output queuing of received packets in the switching hub to be more efficient and cost-effective. This method and system is characterized in the provision of a broadcast output queue in addition to the output queues at the ports of the switching hub, with the broadcast output queue being exclusively used for sequencing broadcast packets and the output queues being used exclusively for sequencing unicast packets. When a broadcast packet is received, the method and system assigns a free-list link node to the broadcast output queue, but not to the output queues, and meanwhile adds one to the broadcast count in each of the last link node in each of the output queues. When a certain port completes the outputting of all associated unicast packets, it is checked whether the broadcast count in the last link node in each output queue is zero or nonzero; if nonzero, the switching hub then outputs every broadcast packet indicated by the broadcast count. The disclosed method and system not only allows a reduced number of memory accesses as compared to the prior art but also requires a low memory capacity to implement, and therefore is more efficient in operation and more cost-effective to implement than the prior art.

15 Claims, 9 Drawing Sheets ive network.

METHOD AND SYSTEM FOR HANDLING THE OUTPUT QUEUING OF RECEIVED PACKETS IN A SWITCHING HUB IN A PACKET-SWITCHING NETWORK

BACKGROUND OF THE INVENTION

1. Field of the Invention

This invention relates to computer network technology, and more particularly, to a method and system for handling the output queuing of received packets in a switching hub in a packet-switching network.

2. Description of Related Art

A computer network system is composed of a number of building blocks, including hubs, bridges, routers, network adapters, terminals, servers, transmission media connectors, network management programs, and so on. A hub is a device that joins communication lines at a central location to provide a common connection to all devices on the network. Various types of hubs are provided in a network, including, for example, standalone repeating hubs, stackable hubs, and switching hubs. A switching hub includes a plurality of ports and is capable of performing the so-called store-and-forward function, which stores the packets (or called frames) received at one port thereof temporarily therein and then outputs the stored packets from designated port or ports thereof so as to forward them to their destinations. A packet is typically 64 bytes to 1518 bytes in length. In Ethernet, there are three types of packets: broadcast packets, multicast packets, and unicast packets. When a switching hub receives a broadcast packet at one port thereof, the received broadcast packet will be subsequently outputted from all the other ports; when a multicast packet is received, it will be subsequently outputted only from some designated ports; and when a unicast packet is received, it will be subsequently outputted solely from one designated port. Presently, a switching hub typically includes 16 ports, with each port having a data rate of 100 MBps (megabyte per second). The conventional switching hub is describing as follows.

FIG. 1 is a schematic diagram showing the core architecture of a conventional switching hub. As shown, the switching hub includes a switching IC (integrated circuit) or a control IC 100, an SRAM (static random-access memory) unit 110, and a memory, such as an SDRAM (synchronous dynamic random-access memory) unit 120. The switching IC 100 contains the control circuits used to control the store-and-forward function for the received packets.

Referring also to FIG. 2, the SRAM unit 110 includes a first storage area 112 for storing a forward table, a second storage area 114 for storing the available link nodes of free lists (hereinafter referred to a free-list link node set), and a third storage area 116 for storing an attribute-entry list. The forward table 112 is used to register the source address and destination port number of each received packet; the free-list link node set 114 is used to store all the available free-list link nodes in the switching hub, each stored free-list link node being indicated by the reference numeral 114*a*; and the attribute-entry list 116 is used to stored a number of attribute entries, each stored attribute entry being indicated by the reference numeral 116*a*. Further, each port of the switching hub is associated with an output queue for sequencing those packets that are to be outputted from this associated port.

FIG. 3A is a schematic diagram used to depict the data structure of each output queue, here designated by the reference numeral 130. Each time when a packet is received and intended to be outputted from a certain designated port, the switching IC 100 will responsively retrieve a free-list link node 114*a* from the free-list link node set 114 in the SRAM unit 110 and then assign the retrieved free-list link node 114*a* to the output queue 130 of the designated port. FIG. 3A shows the case of having three link nodes (herein indicated by the reference numeral 114*a′*) assigned to the output queue 130. Further, each output queue 130 includes an output-queue head H and an output-queue tail T, which are respectively pointed to the first and last link nodes in the output queue 130.

Further, FIG. 3B shows the format of each link node 114*a′* in the output queue 130 of FIG. 3A. As shown, in this preferred embodiment, each link node 114*a′* is 64 bits in length, wherein Bit 0 is used as a drop flag indicative of whether this link node 114*a′* is being used or unused; Bits 1 to 16 are collectively used to serve as a pointer indicative of the address of the next link node; Bit 17 is used to indicate the type of the packet that is pointed by this link node 114*a′*; and Bits 18 to 33 are collectively used to serve as a pointer indicative of the address of the packet buffer where the pointed packet is stored.

Referring back to FIGS. 1 and 2, the SDRAM unit 120 is partitioned into a plurality of blocks 122, each having a size of 1.5 KB (kilobyte) and being used as a packet buffer for temporary storage of one of the received packets. Each attribute entry 116*a* in the attribute-entry list 116 in the SRAM unit 110 is mapped in one-to-one correspondence to one of the packet buffers 122 in the SDRAM unit 120, and is used to indicate whether the corresponding packet has been forwarded or not.

FIG. 3C shows the format of each attribute entry 116*a* in the attribute-entry list 116 in the SRAM unit 110. As shown, each attribute entry 116*a* is also 64 bits in length, wherein Bits 0–15 are collectively used as a pointer indicative of the address of the next free-list link node; Bits 16–32 are collectively used as a port mask; and Bits 33–63 are reserved.

The switching hub is designed to handle the received packets in a FIFO (First-In First-Out) manner. To satisfy this requirement, however, the switching hub of FIG. 1 would be considerably inefficient in its store-and-forward operation. This drawback is depicted with the following example. Assume the switching hub of FIG. 1 receives a broadcast packet at one port (for example, Port 0) thereof and subsequently receives a unicast packet at another port (for example, Port 12) thereof, and the received unicast packet is to be outputted from still another port (for example, Port 1) of the switching hub. The operation performed by the switching hub of FIG. 1 to handle this situation is depicted in FIG. 4. As shown, assume the output queue at Port 1 currently contains 6 link nodes $U_{11}$–$U_{16}$ for the outputting of six unicast packets; the output queue at Port 2 currently contains 2 link nodes $U_{21}$–$U_{22}$ for the outputting of 2 unicast packets; and the output queue at Port 3 currently contains 9 link nodes $U_{31}$–$U_{39}$ (in FIG. 4, Port 4 through Port 15 are eliminated for simplification of the drawing and description). When the switching hub receives a broadcast packet at Port 0, the SRAM unit 110 will responsively assign 15 free-list link nodes 114*a* respectively to the Port 1 through Port 15, thereby forming a broadcast-packet link node B at the end of each output queue, with each broadcast-packet link node B pointing to one of the packet buffers 122 in the SDRAM unit 120 where the received broadcast packet is temporarily stored. The pointed packet buffer is further mapped to one of the attribute entries 116*a* in the attribute-entry list 116 in the SRAM unit 110. The port-mask portion (Bits 16–32) of each attribute entry 116*a* is used to indicate whether the associated broadcast packet has been forwarded or not. At the time $t_2$ when a unicast packet is received at Port 12 and is intended to be outputted from Port 1 for forwarding to its destination, the SRAM unit 110 will responsively assign one free-list link node 114a in the SRAM unit 110 to the output queue at Port 1. At $t_6$, Port 1 retrieves the broadcast packet stored in the one of the packet buffers 122 that is pointed by the broadcast-packet link node B. After this, in order to meet the FIFO requirement, Port 1 will output the unicast packet after the outputting of the broadcast packet is completed. After the broadcast packet is outputted from all the other ports, the SRAM unit 110 will relinquish all the associated 15 link nodes and attribute entries.

It can be learned from the foregoing description that it would involve very frequent accesses to the SRAM unit 110 when handling each received broadcast packet. For instance, the operation of assigning the 15 free-list link nodes to the respective output queues at the 15 ports requires a total of 15 accesses to the SRAM unit 110; and subsequently, the enqueuing of these 15 free-list link nodes to the respective output queues further requires a total of 15 accesses to the SRAM unit 110; and still moreover, after the forwarding of the received broadcast packet is completed, the dequeuing of the 15 link nodes from the respective output queues further requires a total of 15 accesses to the SRAM unit 110. Overall, the forwarding of each broadcast packet through the switching hub requires a total of 93 accesses to the SRAM unit 110, which could significantly slow down the system performance.

Moreover, for each broadcast packet, it requires the assignment of 15 free-list link nodes to the respective output queues at all the ports where the broadcast packet is to be outputted. As a result, when a great number of broadcast packets are received, they will take up an enormously large space in the SRAM unit 110; and therefore, it requires the SRAM unit 110 to be large enough in storage capacity so as to be able to handle these broadcast packets. A large memory capacity, however, would considerably increase the implementation cost of the switching hub. Furthermore, the attribute entries and link nodes that are registered in the SRAM unit 110 in response to the received broadcast packets also take up quite a large storage space in the SRAM unit 110. The SRAM unit 110 should therefore large in storage capacity, which further increase the implementation cost of the network system.

SUMMARY OF THE INVENTION

It is therefore an object of this invention to provide a method and system for handling the output queuing of received packets in a switching hub in a packet-switching network, which can help reduce the number of accesses to the memory as compared to the prior art, so as to help increase the packet transmission performance.

It is another object of this invention to provide a method and system for handling the output queuing of received packets in a switching hub in a packet-switching network, which can be implemented without having to use an attribute-entry list so that the required memory capacity in the switching hub can be reduced as compared to the prior art to help reduce implementation cost.

It is still another object of this invention to provide a method and system for handling the output queuing of received packets in a switching hub in a packet-switching network, which can be implemented with a smaller memory capacity than the prior art while nevertheless is able to handle the forwarding of a large amount of received broadcast packets.

In accordance with the foregoing and other objects of this invention, a new method and system is provided for handling the output queuing of received packets in a switching hub in a packet-switching network.

By the invention, a broadcast output queue is provided in addition to the output queues at the ports of the switching hub. In response to a received packet, it is checked whether the received packet is a unicast packet or a broadcast output queue; if a unicast packet, the method of the invention assigns a free-list link node to the output queue at the destination port of the received unicast packet, the link node containing a broadcast count indicative of the number of currently received broadcast packets in the switching hub; otherwise, if a broadcast packet, the method of the invention assigns a free-list link node to the broadcast output queue and meanwhile adding one to the broadcast count in each of the last link node in each of the output queues at the ports of the switching hub. Subsequently, it is checked whether the broadcast count in each of the last link node in each of the output queues at the ports of the switching hub; if zero, the unicast packet pointed by the link node is outputted from the designated port; otherwise, if nonzero, the switching hub outputs every broadcast packet indicated by the broadcast count.

The invention further provides a system for use on a switching hub in a packet-switching network for the purpose of handling the output queuing of received packets in the switching hub, the switching hub having a plurality of ports, with each port being associated with an output queue. The system of the invention comprises the following constituent parts: (a) a first memory unit for storing a forward table and a free-list link node set, the forward table being used to register the source address and destination port number of each received packet, and the free-list link node set being used to contain available link nodes of free lists in the switching hub; (b) a second memory unit including a plurality of packet buffers for temporary storage of received packets; (c) a plurality of output queues, each being associated with one of the ports of the switching hub and being used for the sequencing of received packets that are awaiting for outputting from designated ports; (d) a broadcast output queue used for the sequencing of received broadcast packets that are awaiting for outputting from the switching hub; and (e) a switching control unit for controlling the access operations to the first and second memory units and the enqueuing and dequeuing of the output queues and the broadcast output queue; the switching control unit operating in such a manner that when a packet is received, the switching control unit checks whether the received packet is a unicast packet or a broadcast packet; if a unicast packet, the switching control unit retrieves a free-list link node from the first memory unit and then assigns the retrieved link node to the output queue at the destination port of the received unicast packet, the link node further containing a broadcast count indicative of the number of currently received broadcast packets in the switching hub; otherwise, if a broadcast packet, the switching control unit retrieves a free-list link node from the first memory unit and assigns the retrieved link node to the broadcast output queue and meanwhile adding one to the broadcast count in each of the last link node in each of the output queues.

The foregoing method and system of the invention not only allows a reduced number of memory accesses as compared to the prior art, but also requires a low memory capacity to implement. The invention is therefore more efficient in operation and more cost-effective to implement than the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
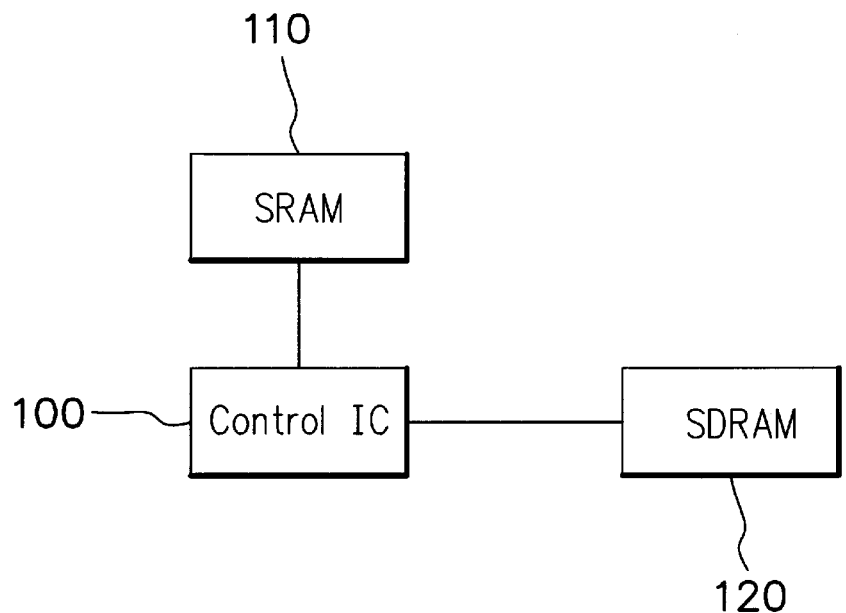
FIG. 1 is a schematic diagram showing the core architecture of a conventional switching hub.

The invention provides a novel method and system for handling the output queuing of received packets in a switching hub in a packet-switching network. The switching hub is also based on the architecture shown in FIG. 1, which includes a switching IC 100, a first memory unit such as an SRAM unit 110, and a second memory unit such as an SDRAM unit 120, and has a total of 16 ports for receiving and forwarding packets.

Figure 2:
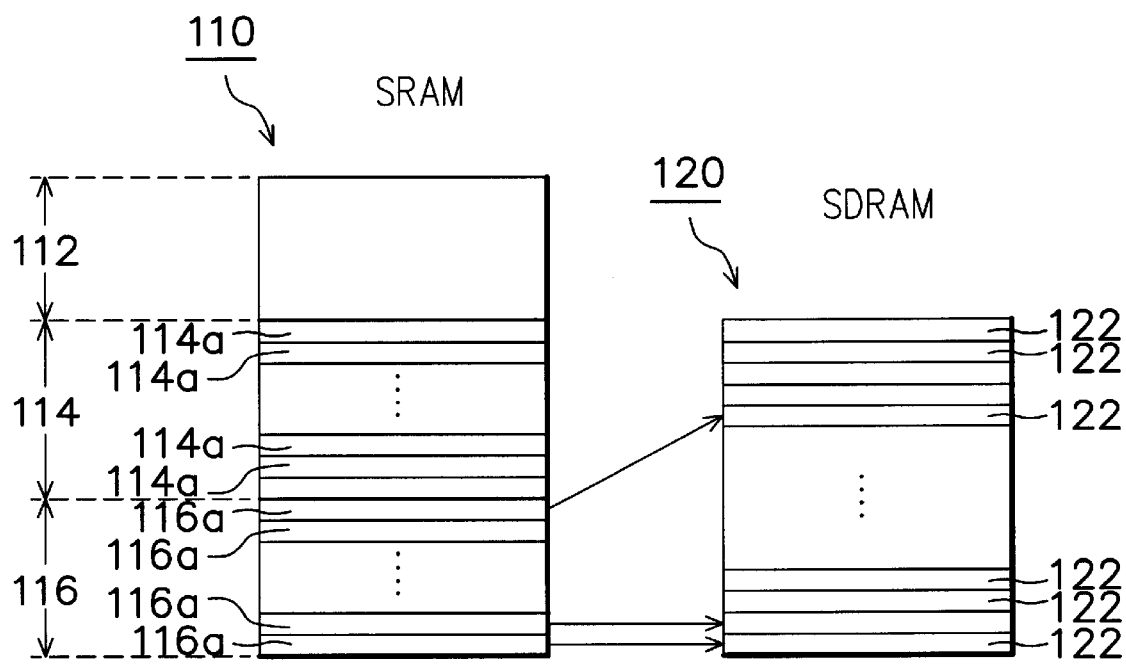
FIG. 2 is a schematic diagram showing the memory storage schemes respectively in the SRAM unit and the SDRAM unit utilized in the switching hub of FIG. 1.
Figure 3A:
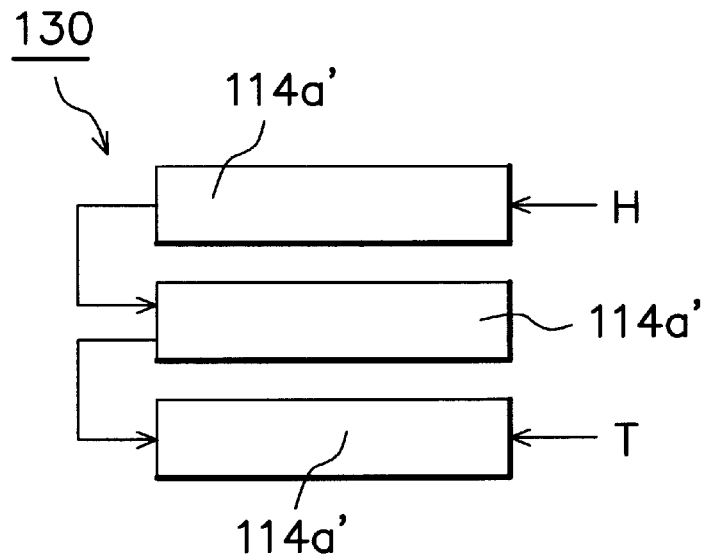
FIG. 3A is a schematic diagram used to depict the data structure of each output queue at each port of the switching hub of FIG. 1.
Figure 3B:
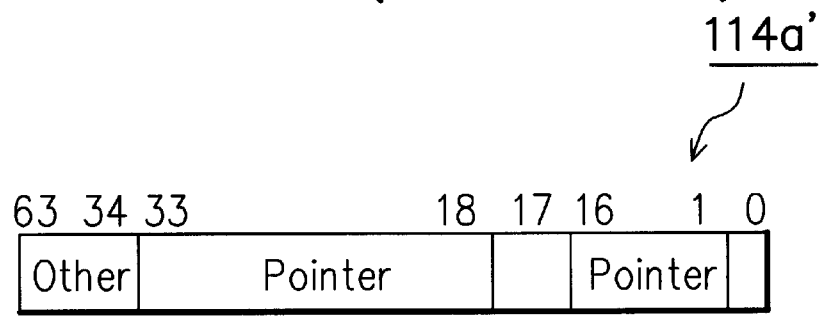
FIG. 3B is a schematic diagram used to depict the data format of each link node in each output queue in the switching hub of FIG. 1.
Figure 3C:
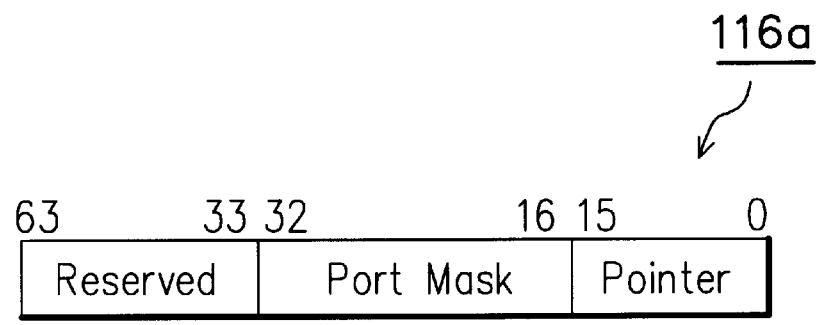
FIG. 3C is a schematic diagram used to depict the data format of each attribute entry stored in the SRAM unit utilized in the switching hub of FIG. 1.
Figure 4:
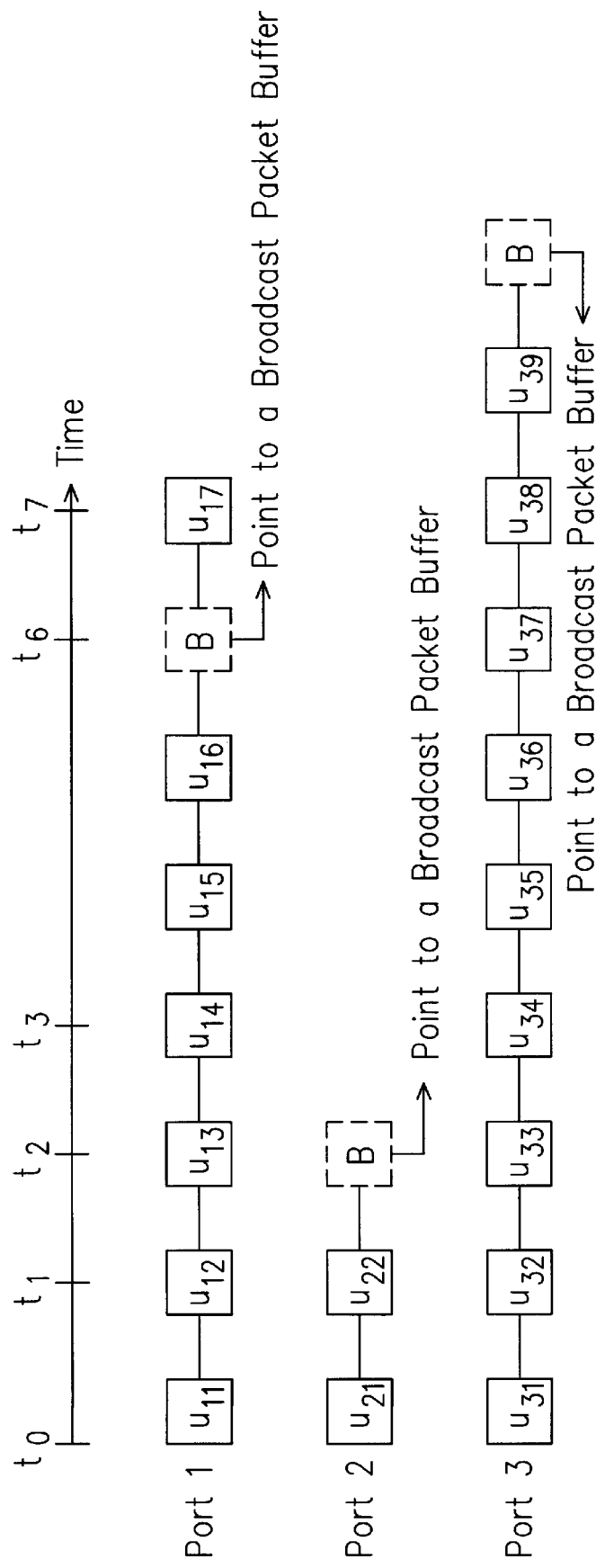
FIG. 4 is a schematic diagram used to depict the data structure of some of the output queues at the ports of the switching hub of FIG. 1.
Figure 5:
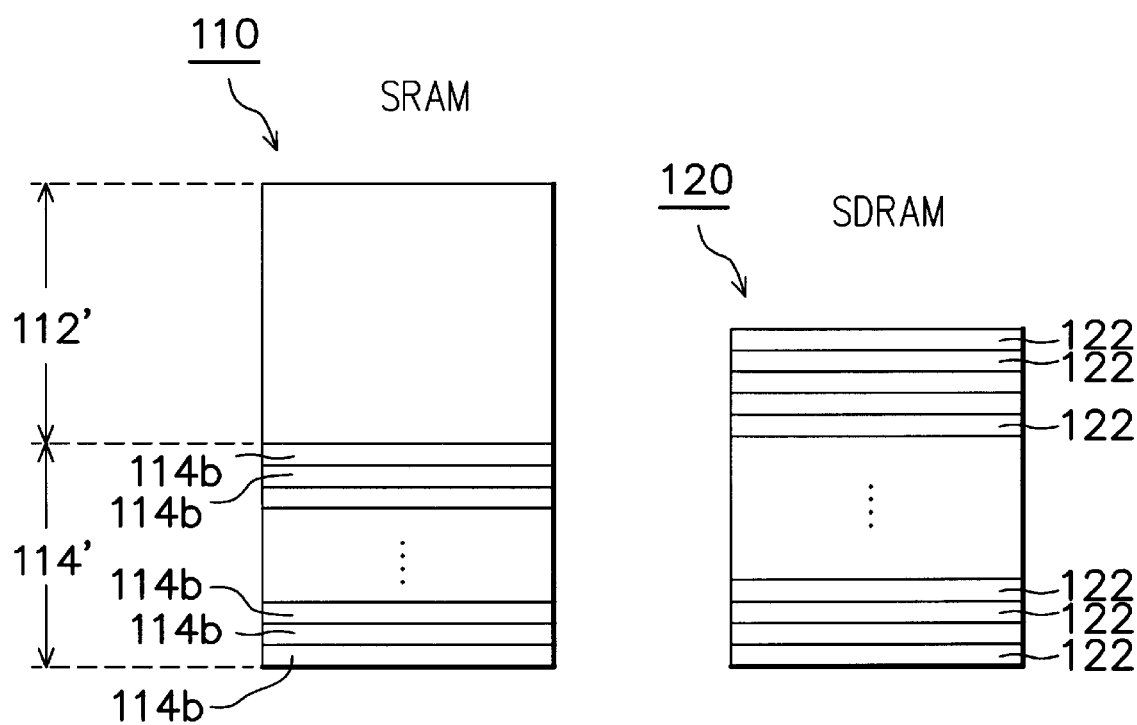
FIG. 5 is a schematic diagram showing the memory storage schemes respectively in the SRAM unit and the SDRAM unit in accordance with the invention.

FIG. 5 shows the respective memory storage schemes used in the SRAM unit 110 and the SDRAM unit 120 in accordance with the invention. As shown, the memory storage schemes according to the invention differ from those of the prior art shown in FIG. 2 only in that the attribute-entry list 116 used by the prior art is here eliminated. In accordance with the invention, the SRAM unit 110 includes a first storage area for storing a forward table 112' and a second storage area for storing a set of free-list link nodes 114'. The forward table 112' is used to register the source address and destination port number of every received packet; while the free-list link node set 114' is used to store all the available free-list link nodes in the switching hub, each stored free-list link node being indicated by the reference numeral 114b. As to the SDRAM unit 120, its storage scheme is entirely identical to that used by the prior art shown in FIG. 2, i.e., it is also partitioned into a plurality of blocks 122, each having a size of 15 KB (kilobyte) and being used as a packet buffer for temporary storage of each received packet before the received packet is forwarded.

This invention is characterized in the provision of a broadcast output queue in addition to the output queues at the ports of the switching hub, with the broadcast output queue being exclusively used for sequencing broadcast packets and the output queues being used exclusively for sequencing unicast packets. This feature is disclosed in full details in the following.

Figure 6:
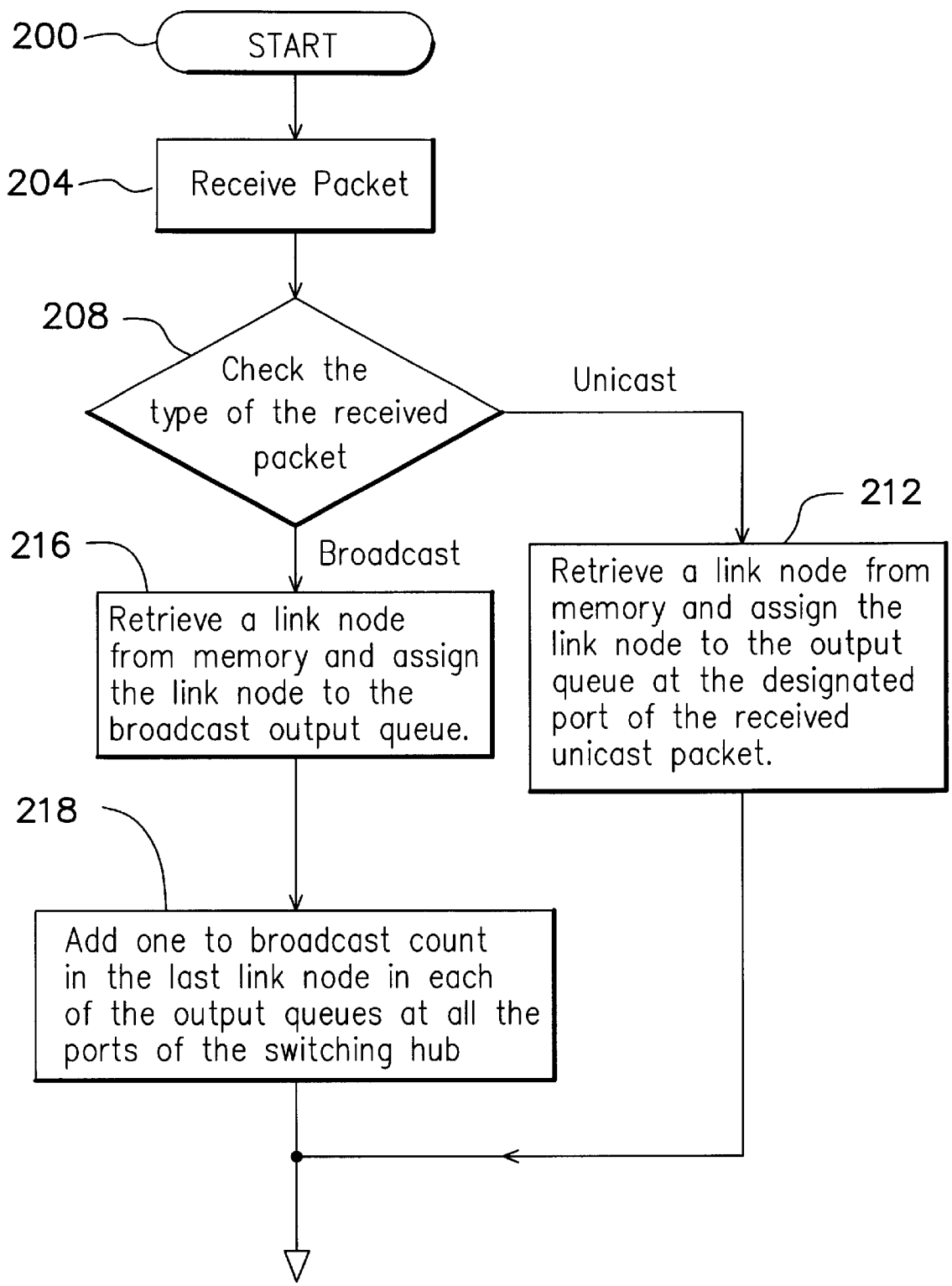
FIG. 6 is a flow diagram showing the steps involved in the method of the invention for handling the output queuing of packets in the switching hub in accordance with the invention.

FIG. 6 is a flow diagram showing the steps involved in the method of the invention for handling the output queuing of received packets. In this embodiment, the invention is utilized on the type of switching hub in the Ethernet. In this case, the switching hub is included with a total of 16 ports (denoted by Port 0, Port 1, Port 2, . . . , and Port 15, respectively) for receiving packets from various sources and forwarding the received packets to their intended destinations.

Referring to FIG. 6 together with FIG. 5, in the first step 200, the switching hub is started to operate. In the step 204, a packet is received by the switching hub. In the next step 208, it is checked that whether the received packet is a broadcast packet or a unicast packet. If a broadcast packet, the procedure goes to the step 216; otherwise, if a unicast packet, the procedure goes to the step 212.

In the step 212, the switching IC 100 retrieves a free-list link node 114b from the SRAM unit 110 and assign it to the output queue at the destination port of the received unicast packet (this link node is hereinafter referred to as a unicast-packet link node).

On the other hand, in the step 216, the switching IC 100 retrieves a free-list link node 114b from the SRAM unit 110 and assign it to the broadcast output queue. Next, in the step 218, the broadcast count (to be detailed later) in the last link node in each of the output queues is increased by one.

Figure 7:
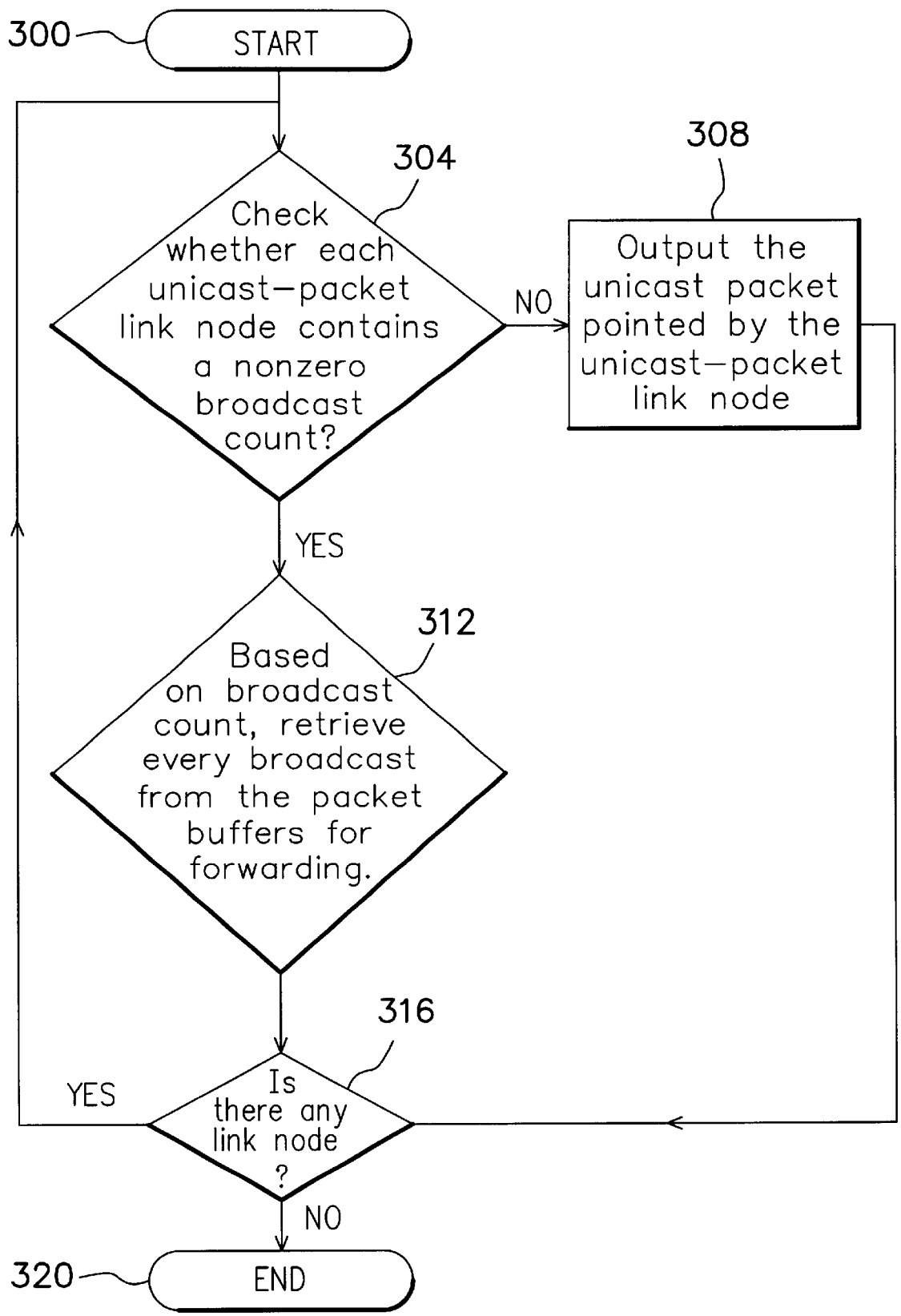
FIG. 7 is a flow diagram showing the steps involved in the operation of outputting a received broadcast packet from all the other ports of the switching hub.

FIG. 7 is a flow diagram showing the steps involved in the operation of outputting a received broadcast packet from all the other ports of the switching hub.

As shown, in the first step 300, the forwarding operation is started. Then, in the step 304, each unicast-packet link node in each of the output queues at the ports is checked to see whether its broadcast count therein is zero or nonzero. If zero, the procedure goes to the step 308; and otherwise, if nonzero, the procedure goes to the step 312.

In the step 308, the corresponding unicast packet is outputted from its designated port. The procedure then goes to the step 316, in which it is checked whether there is still any link node in the output queues. If YES, the procedure returns to the step 304; otherwise, the procedure goes to the step 320 to be ended.

On the other hand, in the step 312, all the broadcast packets that are indicated by the broadcast count are retrieved from the corresponding packet buffers 122 in the SDRAM unit 120 and then outputted from all the ports of the switching hub other than the receiving port. Next, in the step 316, it is checked whether there is still any link node in the output queues. If YES, the procedure returns to the step 304; otherwise, the procedure goes to the step 320 to be ended.

Figure 8:
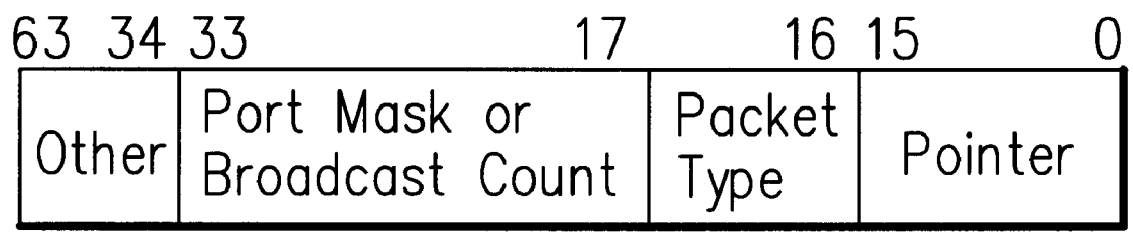
FIG. 8 is a schematic diagram showing the data format of each link node in each output queue.

FIG. 8 is a schematic diagram showing the data format of each link node in each of the output queues at the ports of the switching hub. As shown, Bits 0–15 are collectively used to serve as a pointer indicative of the address of the next link node; Bit 16 is used to indicate whether the pointed packet is a unicast packet or a broadcast packet; Bits 17–33 are collectively used either as a port mask in the case of the pointed packet being a broadcast packet, or as a broadcast count in the case of the pointed packet being a unicast packet. When used as a broadcast count, it indicates the number of broadcast packets that are to be outputted immediately after the unicast packet pointed by this link node is outputted; and whereas, when used as a port mask, it indicates whether the associated port has completed the outputting of the corresponding broadcast packet or not.

Figure 9:
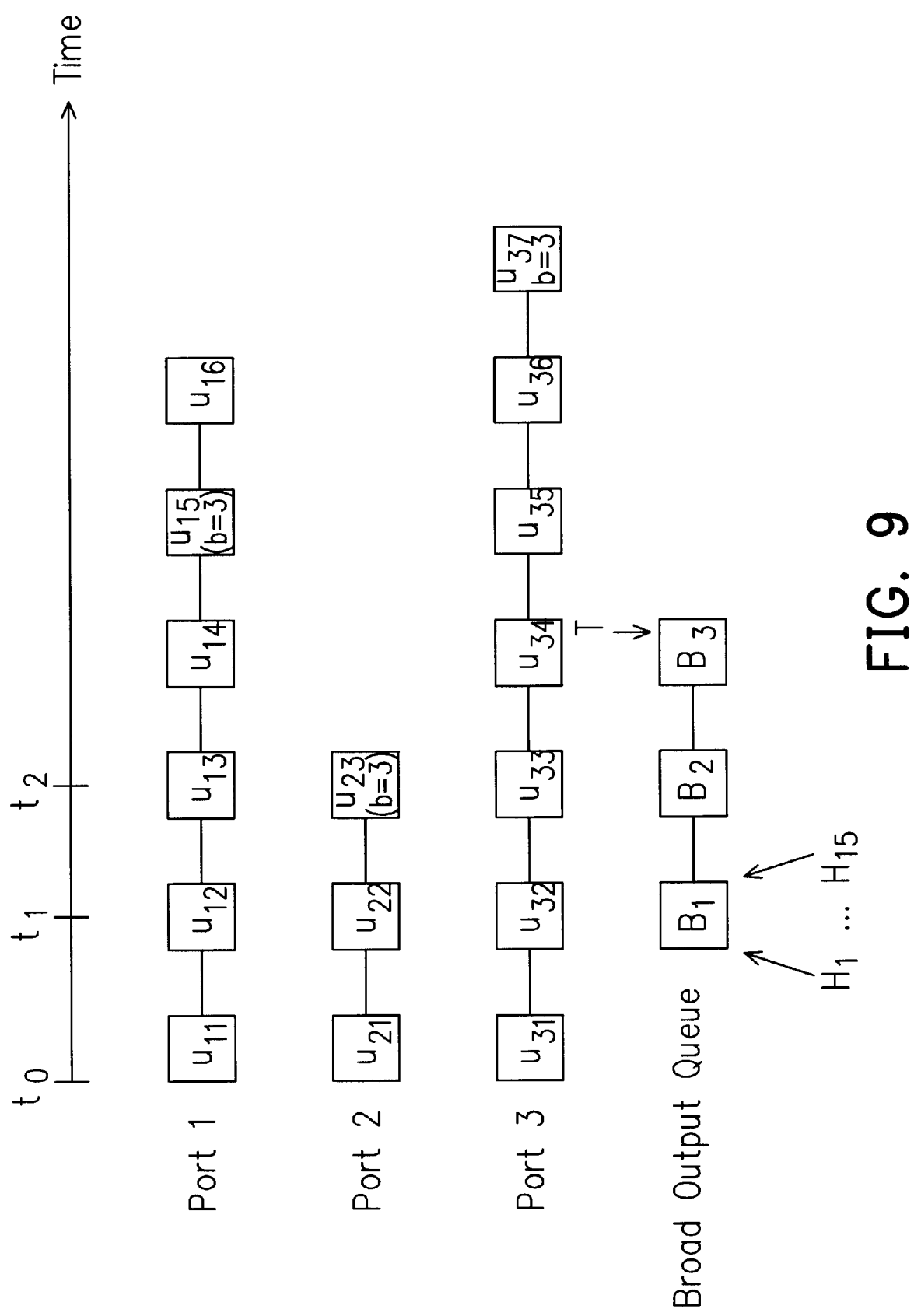
FIG. 9 is a schematic diagram used to depict the data structure of the output queues at the ports of the switching hub when forwarding a broadcast packet in accordance with the invention.

FIG. 9 is a schematic diagram used to depict the data structure of the broadcast output queue along with the output queues at the ports of the switching hub when forwarding a received broadcast packet. This diagram helps to explain how the invention can perform the store-and-forward operation for all received packets more efficiently in a FIFO manner than the prior art. In the following example, it is assumed that a broadcast packet is received at Port 0 and which is to be subsequently outputted from all the other ports (i.e., Port 1 through Port 15) of the switching hub. For simplification of the drawing and description, only Port 1, Port 2, and Port 3 are shown in FIG. 9 and Port 4 through Port 15 are omitted.

As shown in FIG. 9, at the time $t_2$, assume the output queue at Port 1 contains 5 link nodes $U_{11}$–$U_{15}$; the output queue at Port 2 contains 3 link nodes $U_{21}$–$U_{23}$; and the output queue at Port 3 contains 7 link nodes $U_{31}$–$U_{37}$. These link nodes are each implemented by one free-list link node 114b in the SRAM unit 110, which points in one-to-one correspondence to one of the packet buffers 122 in the SDRAM unit 120 where a received packet is temporarily stored and awaiting for forwarding.

Assume Port 0 receives three broadcast packets, which are to be subsequently outputted from all the other ports of the switching hub (i.e., Port 1 through Port 15) for forwarding to their destinations. In this case, when the first broadcast packet is received, the switching IC 100 responsively retrieves a free-list link node 114b from the SRAM unit 110 and assign it to the broadcast output queue. Since there are three broadcast packets received, the broadcast output queue will contain three link nodes B1, B2, and B3, as illustrated in FIG. 9. In accordance with the invention, the manipulation on this broadcast output queue is entirely independent from that on the output queues at the ports of the switching hub.

Next, when each time the broadcast packet is put into the broadcast output queu, the switching IC 100 adds one to each broadcast count in the last link node of each of the output queues; i.e., adds one to the broadcast count (here denoted by b) in the link node $U_{15}$ in the output queue at Port 1, to the broadcast count in the link node $U_{23}$ in the output queue at Port 2, to the broadcast count in the link node $U_{37}$ in the output queue at Port 3, and so forth. In this example, since three broadcast packets are received, the final broadcast count b are 3. The broadcast count indicates that, after the corresponding unicast packets of $U_{15}$, $U_{23}$, and $U_{37}$ are outputted, the switching IC 100 will base on this broadcast count b to retrieve the corresponding broadcast packets from the packet buffers 122 in the SDRAM unit 120 and then outputs the broadcast packets successively from the ports.

In the output queues, each of those link nodes (such as $U_{15}$, $U_{23}$, and $U_{37}$) that contains a broadcast count further includes a broadcast-output-queue head indicative of the first broadcast packet that is to be outputted. These broadcast-output-queue heads are respectively denoted by $H_1, H_2, \ldots,$ and $H_{15}$, and are all pointed to the first link node $B_1$ in the broadcast output queue, as illustrated in FIG. 9. When Port 1 completes the outputting of the broadcast packet pointed by the link node $B_1$, the broadcast-output-queue head $H_1$ in its associated output queue is instead pointed to the second link node $B_2$ in the broadcast cast output queue; and likewise for the other ports. The broadcast output queue further uses a common broadcast-output-queue tail T which is pointed to the last link node in the broadcast output queue. When the broadcast-output-queue heads $H_1$, $H_2, \ldots,$ and $H_{15}$ and the broadcast-output-queue tail T are all pointed to the same link node, it indicates that all the received broadcast packets have been outputted. After this, even if a unicast packet is received, for instance a unicast packet received at Port 12 and to be outputted from Port 1, the switching IC 100 will responsively retrieve a free-list link node 114b from the SRAM unit 110 and assign it to the output queue at Port 1, thereby forming a unicast-packet link node $U_{16}$ at the end of the output queue at the Port 1. Due to its broadcast count b being nonzero, Port 1 will output this unicast packet pointed by the link node $U_{16}$ until the completion of the outputting of all the broadcast packets indicated by the broadcast count b.

The foregoing method of the invention allows the store-and-forward operation for the received packets to be performed more efficiently in a FIFO manner than the prior art through the additional provision of the broadcast output queue to the output queues at the ports of the switching hub.

In addition to method, the invention can also be defined as a system as depicted in the following with reference to FIG. 10.

Figure 10:
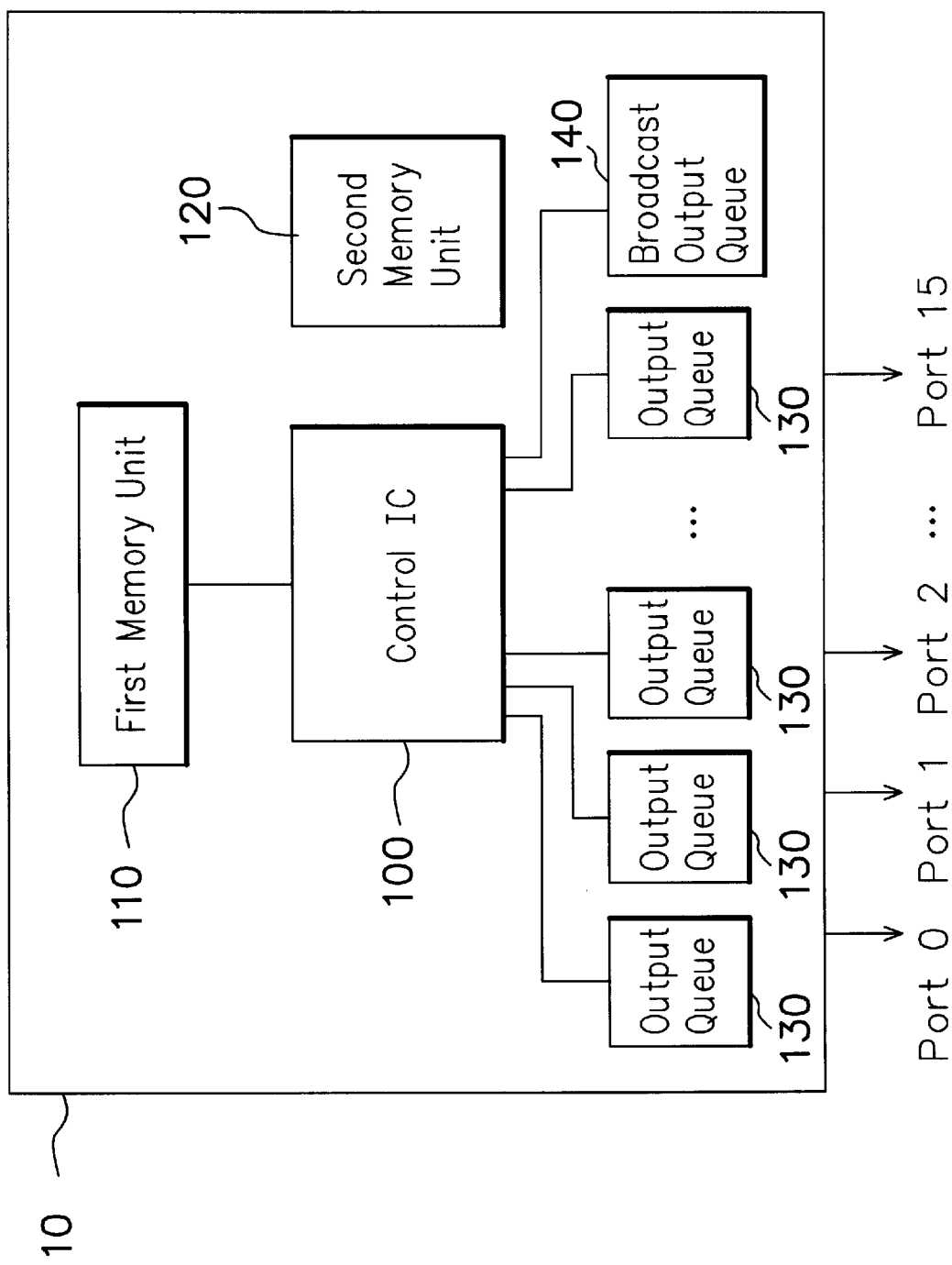
FIG. 10 is a schematic diagram showing the architecture of a switching hub that utilizes the invention for handling the output queues for received packets.

FIG. 10 is a schematic diagram showing the architecture of a switching hub that utilizes the method of the invention for handling received packets. The switching hub is here indicated by the reference numeral 10. The switching hub 10 has a total of 16 ports and includes a switching IC 100, a first memory unit 110 such as an SRAM unit, a second memory unit 120 such as an SDRAM unit, a total of 16 output queues 130 respectively in association with the 16 ports of the switching hub, and a broadcast output queue 140. As shown in FIG. 5, the SRAM unit 110 includes a first storage area for storing a forward table 112' and a second storage area for storing a free-list link node set 114'. The forward table 112' is used to register the source address and destination port number of each received packet; while the free-list link node set 114' is used to store all the available link nodes of free lists in the switching hub, each stored free-list link node being indicated by the reference numeral 114b. The SDRAM unit 120 is partitioned into a plurality of packet buffers 122, each being used for temporary storage of one received packet, whether broadcast packet or unicast packet. The 16 output queues 130 are associated respectively with the 16 ports (i.e., Port 0, Port 1, Port 2, . . . , and Port 15) of the switching hub 10. The enqueuing and dequeuing of the output queues 130 are controlled by the switching IC 100. In operation, for example, when Port 0 receives a unicast packet that is intended to be forwarded through Port 1 to its destination, the switching IC 100 will responsively retrieve a free-list link node 114b from the free-list link node set 114' in the SRAM unit 110 and assign the retrieved link node to the output queue at Port 1. The broadcast output queue 140 is exclusively used for the sequencing of broadcast packets, and the enqueuing and dequeuing of link nodes to and from the broadcast output queue 140 is also controlled by the switching IC 100. In operation, for instance, when Port 0 receives a broadcast packet, the switching IC 100 responsively retrieves a free-list link node 114b from the free-list link node set 114' in the SRAM unit 110 and then assigns it to the broadcast output queue 140; and meanwhile, the switching IC 100 adds one to the broadcast count in each of the last unicast-packet link node in each of the output queue 130. The store-and-forward operation is described earlier in this specification, so details thereof will not be repeated here.

Each unicast-packet link node includes a broadcast-output-queue head which is pointed to the first link node in the broadcast output queue. Furthermore, the broadcast output queue includes a broadcast-output-queue tail which is pointed to the last link node in the broadcast output queue. Each unicast-packet link node in each output queue includes a packet pointer which is pointed to one of the packet buffers 122 in the SDRAM unit 120 where the associated unicast packet is stored; and similarly, each broadcastpacket link node in the broadcast output queue includes a packet pointer which is pointed to one of the packet buffers 122 in the SDRAM unit 120 where the associated broadcast packet is stored.

By the invention, the handling of the output queuing of received packets in the switching hub would involve a reduced number of accesses to the SRAM and SDRAM units as compared to the prior art. Moreover, the invention can be implemented without having to use attribute entries or assign link nodes to all the output queues at the ports of the switching hub when a broadcast packet is received. This allows the switching hub to use SRAM and SDRAM with lower capacities than the prior art.

In conclusion, the invention provides a method and system for handling the output queuing of received packets in a switching hub in a packet-switching network by means of an additional broadcast output queue. Moreover, each link node in each of the output queues is included with a broadcast count for registering the number of broadcast packets that are to be forwarded by the switching hub. The invention not only allows a reduced number of memory accesses as compared to the prior art, but also requires a low memory capacity to implement. The invention is therefore more efficient in operation and more cost-effective to implement than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for use on a switching hub in a packet-switching network for the purpose of handling the output queuing of received packets in the switching hub, the switching hub having a plurality of ports, with each port being associated with an output queue, the method comprising the steps of:

providing a broadcast output queue in addition to the output queues at the ports of the switching hub;

in response to a received packet, checking whether the received packet is a unicast packet or a broadcast packet;

if unicast packet, assigning a free-list link node to the output queue at the destination port of the received unicast packet, the link node containing a broadcast count indicative of the number of currently received broadcast packets in the switching hub; otherwise, if a broadcast packet, assigning a free-list link node to the broadcast output queue and meanwhile adding one to the broadcast count in each of the last link node in each of the output queues at the ports of the switching hub;

checking whether the broadcast count in each of the last link node in each of the output queues at the ports of the switching hub;

if zero, outputting the unicast packet pointed by the link node; otherwise, if nonzero, outputting the broadcast packet indicated by the broadcast count.

2. The method of claim 1, wherein the broadcast output queue includes a common broadcast-output-queue tail which is pointed to the last link node in the broadcast output queue.

3. The method of claim 1, wherein the each unicast-packet link node in the output queues includes a broadcast-output-queue head which is pointed to the first link node in the broadcast output queue.

4. The method of claim 2, wherein the broadcast output queue further includes a broadcast-output-queue tail which is pointed to the last link node in the broadcast output queue.

5. The method of claim 1, wherein each unicast-packet link node in the output queues further includes a packet pointer which is pointed to a storage location where the associated unicast packet is stored.

6. The method of claim 1, wherein each link node in the broadcast output queue further includes a packet pointer which is pointed to a storage location where the associated broadcast packet is stored.

7. The method of claim 1, wherein the free-list link node is prestored in an SRAM unit.

8. The method of claim 1, wherein the received packet is temporarily stored in an SDRAM unit before being outputted from the switching hub.

9. A system for use on a switching hub in a packet-switching network for the purpose of handling the output queuing of received packets in the switching hub, the switching hub having a plurality of ports, with each port being associated with an output queue; the system comprising:

a first memory unit for storing a forward table and a free-list link node set, the forward table being used to register the source address and destination port number of each received packet, and the free-list link node set being used to contain available link nodes of free lists in the switching hub;

a second memory unit including a plurality of packet buffers for temporary storage of received packets;

a plurality of output queues, each being associated with one of the ports of the switching hub and being used for the sequencing of received packets that are awaiting for outputting from designated ports;

a broadcast output queue used for the sequencing of received broadcast packets that are awaiting for outputting from the switching hub; and a switching control unit for controlling the access operations to the first and second memory units and the enqueuing and dequeuing of the output queues and the broadcast output queue;

the switching control unit operating in such a manner that when a packet is received, the switching control unit checks whether the received packet is a unicast packet or a broadcast packet;

if a unicast packet, the switching control unit retrieves a free-list link node from the first memory unit and then assigns the retrieved link node to the output queue at the destination port of the received unicast packet, the link node further containing a broadcast count indicative of the number of currently received broadcast packets in the switching hub;

otherwise, if a broadcast packet, the switching control unit retrieves a free-list link node from the first memory unit and assigns the retrieved link node to the broadcast output queue and meanwhile adding one to the broadcast count in each of the last link node in each of the output queues.

10. The system of claim 9, wherein the first memory unit is a SRAM unit.

11. The system of claim 9, wherein the second memory unit is a SDRAM unit.

12. The system of claim 9, wherein each unicast-packet link node in each of the output queues further includes a broadcast-output-queue head which is pointed to the first link node in the broadcast output queue.

13. The system of claim 12, wherein the broadcast output queue further includes a broadcast-output-queue tail which is pointed to the last link node in the broadcast output queue.

14. The system of claim 9, wherein each unicast-packet link node in each of the output queues further includes a packet pointer which is pointed to one of the packet buffers in the second memory unit where the associated unicast packet is stored.

15. The system of claim 9, wherein each broadcast-packet link node in the broadcast output queue further includes a packet pointer which is pointed to one of the packet buffers in the second memory unit where the associated broadcast packet is stored.

* * * * *